3,354,125
POLYMERS FROM DIAMINOBENZANILIDES

Ralph W. Smith and William A. H. Huffman, Durham, and Jack Preston, Raleigh, N.C., assignors to Monsanto Company, St. Louis, Mo., a corporation of Delaware
No Drawing. Filed July 29, 1963, Ser. No. 298,467
14 Claims. (Cl. 260—78)

This invention relates to wholly aromatic polyamides and more particularly to polyamides prepared from the reaction of diaminobenzanilides and diacid chlorides.

Wholly aromatic polyamides prepared from aminoacid chloride hydrochlorides, from simple aromatic diamines and aromatic diacid chlorides, and from various other high molecular weight diamines and diacid chlorides are well known in the prior art. Such compositions have been found to have high temperature resistance in combination with other desirable properties.

It is an object of this invention to provide polyamides which are prepared from diacid chlorides and diamines containing only two aromatic nuclei linked by a preformed carbonamide linkage.

It is another object of the invention to provide a process for the preparation of wholly aromatic thermally stable polyamides using diaminobenzanilides and diacid chlorides. It is another object of the invention to provide fibers, filaments, films and other shaped articles from wholly aromatic diaminobenzanilide polymers.

Other objects and advantages of the invention will become apparent from the description which follows.

In general, the objects of the invention are accomplished by the provision of polyamides prepared from diaminobenzanilides and diacid chlorides. The polymers of this invention have the general formula:

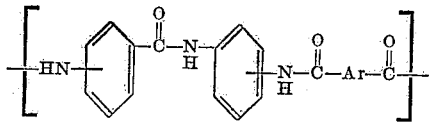

wherein Ar represents a divalent aromatic radical which may be phenylene, naphthylene or biphenylene and wherein the carbonamide to aromatic radical bonds are non-ortho oriented. These polymers are prepared by solution or interfacial polymerization methods employing the diamine in solution and the diacid chloride either in the dry form or in solution in a suitable organic solvent.

The diamines of this invention may be used not only in the form of the diamine but also in the form of the diamine dihydrochloride. These diamines include all of the various benzanilide isomers which are non-ortho oriented. Such diamines include 3,3'-diaminobenzanilide, 4,4'-diaminobenzanilide, 3,4'-diaminobenzanilide and 4,3'-diaminobenzanilide. These diamines may be prepared by any of the well known methods for preparation of such diamines, for example, by the reaction of nitroanilines and m- or p-nitrobenzoyl chlorides followed by reduction of the nitro groups to amine groups.

The aromatic diacid chlorides which are useful in the practice of the present invention include such acid chlorides as isophthaloyl chloride and terephthaloyl chloride, naphthylene dicarbonyl chloride and biphenylene dicarbonyl chloride derivatives such as

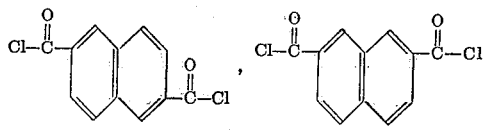

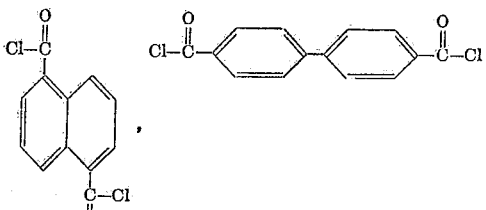

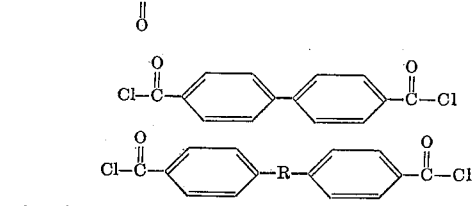

wherein R is $$-CH_2-, \quad -\overset{O}{\underset{\|}{C}}-, \quad -O-, \quad -SO_2-, \quad -\overset{CH_3}{\underset{CH_3}{\overset{|}{C}}}-$$

and the like.

The preparation of the polymers of this invention may be accomplished by solution or interfacial polymerization methods. The polymerization reaction is preferably conducted using a solution polymerization technique. In the solution polymerization method, the diamine is dissolved in a suitable solvent which is inert to the polymerization reaction. The same solvents may be employed for both the diamine and the diacid. Among such solvents there may be mentioned dimethyl acetamide, 1-methyl-2-pyrrolidone, 1,5-dimethyl-2-pyrrolidone, hexamethyl phosphoramide and the like. These solvents are rendered more effective in many instances by mixing them with a small amount, up to 10 percent, of a salt of an alkali or an alkaline earth metal, such as lithium chloride, lithium bromide, magnesium chloride, magnesium bromide, beryllium chloride or calcium chloride. The preferred solvents for solution polymerization are dimethylacetamide or dimethylacetamide containing 5 percent dissolved lithium chloride. The diamine solution is cooled to between 0 and —40° C. and the diacid chloride is added either as a solid or in a solution of one of the afore-mentioned solvents. The mixture is then stirred for a period of time until polymerization is substantially complete and a high viscosity is obtained. The highly viscous solution may be spun per se or the polymer may be isolated by pouring the mixture into a nonsolvent and then washing and drying the polymer and preparing the spinning solution.

The interfacial polymerization reaction is conducted by mixing water, an emulsifier, and the diamine or its dihydrochloride. A proton acceptor is then added and the mixture is stirred rapidly. During this rapid stirring a solution of the diacid chloride in an inert organic solvent is added. The mixture is stirred until polymerization is complete. The polymer is then isolated by filtration, washing and drying. The diacid chloride solvent may be a cyclic non-aromatic oxygenated organic solvent such as cyclic tetramethylene sulfone, 2,4-dimethyl cyclic tetramethylene sulfone, tetrahydrofuran, propylene oxide and cyclohexanone. Further suitable solvents for the diacid chloride include chlorinated hydrocarbons such as methylene chloride, chloroform and chlorobenzene, benzene, acetone, nitrobenzene, benzonitrile, acetophenone, acetonitrile, tolene and mixtures of the above solvents such as tetrahydrofuran and benzonitrile, tetrahydrofuran and acetophenone, benzene and acetone and the like.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor indicates a compound which acts as an acid scavenger to neutralize HCl as formed during the reaction and keeps the reaction going until completion. Suitable proton acceptors include sodium carbonate, calcium carbonate, sodium hydroxide, potassium hydroxide, calcium hydroxide, tertiary amines such as triethylamine, trimethylamine, tripropylamine, ethyl dimethylamine, tributylamine and similar compounds which react as desired. The amounts of the various reactants which may be employed will, of course, vary according to the type of polymer desired. However, in most instances substantially equimolar quantities or a slight excess of diced halide chloride to diamine may be used for interfacial polymerization reactions. Sufficient proton acceptor to keep the acidic by-products neutralized is added, the exact amount easily determined by one skilled in the art.

The aromatic polyamides of this invention have many excellent and highly desirable properties which render them useful in a wide range of applications. They exhibit excellent solubility in common organic solvents. Solutions may be prepared which are suitable for use in dry or wet-spinning operations to produce filaments and fibers, in casting of films, and other processing to various shaped articles. They are readily capable of being prepared to high molecular weight in these solvents.

Initially the high molecular weight polymers of the invention soften at relatively low temperatures, especially under conditions of heat and pressure, conditions suitable for molding, but they are stabilized to a marked degree by heat or annealing treatments so that certain compositions show no endothermic or exothermic transitions up to 500° C. by Differential Thermal Analysis, excellent retention of weight in the temperature range of 400° C. to 650° C. by Thermogravimetric Analysis and excellent resistance to strong acids, strong bases, and organic solvents. Filaments may be hot drawn to develop high strength fibers, that is, 6 to 10 grams per denier or above, which are highly oriented and crystalline, and which retain excellent strength, fiber moduli, and other properties in the range of 300° C. to 400° C. and above 400° C.

Aromatic polyamides having the stabilities to high temperature observed for these stabilized compositions are usually characterized by relatively poor solubility in common solvents and infusibility. The high molecular weight aromatic polyamides of this invention show unusually high solubility with dopes of up to 30 percent solids possible at room temperature using solvents commonly employed for such purposes. Polymers having inherent viscosities of 2.5 to 3.0 and above are readily prepared from purified intermediates. The exceptional solubility and ease of preparation to very high molecular weights necessary for the formation of high strength fibers would be expected from non-crystalline random copolymers. The diamine moieties of these aromatic polyamides having elements associated with structural dissymmetry or low order may enter the polymer chains randomly or as indicated by the following designations used merely to illustrate some of the possibilities.

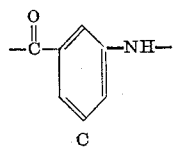
C

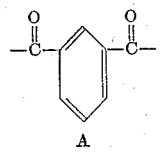
A

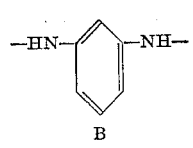
B

An ABC polymer unit with all m-oriented phenylene radicals would be

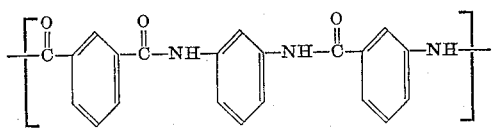

This ABC polymer could be coupled with an ACB polymer unit having all m-oriented phenylene rings such as

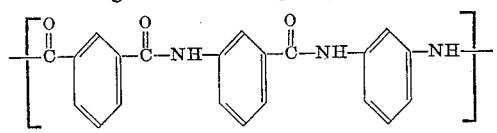

to give polymer units of the formula

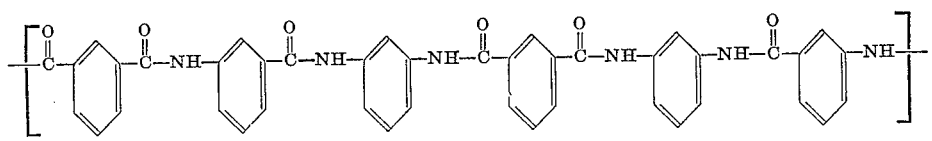

distributed randomly within the overall polymer chain made up predominately of ABC units, ABC—ABC ACB ABC—ABC ACB ABC—ABC. Random distribution, for example, ABC ACB ABC and so forth, should result in low melting or decomposition points, high solubility, and a low degree of interchain bonding and close packing of the polymer chains commonly associated with non-crystalline polymers. These properties are observed. Surprisingly, the aromatic polyamides and shaped structures therefrom may be processed so as to obtain the highly stable and desirable products described above.

The heat resistance of these aromatic polyamides and shaped articles therefrom may result from one or more of the following factors or other structural changes not yet predictable or well understood: The diamine moieties may enter the polymer chains in a fairly orderly manner due to a difference in reactivity of the two amino groups of the diamine. Structural order permitting close packing of the polymer chains may be an inherent property of the formed polymer chain especially upon application of heat or other treatments permitting mobility of the polymer chains with attendant close packing of the polymer chain and the development of crystallinity. Orientation of the randomly coiled polymer chains may permit the onset and fixation of interchain bonds such as hydrogen bonding resulting in high strength oriented crystalline structures which are otherwise noncrystalline, highly soluble and fusible by the application of heat and pressure.

The utility of the polymers of this invention ranges from textiles to a wide variety of other industrial end uses. In the form of fibers and filaments, they may be used for thermal and mechanical-shock insulation materials, rigid structures such as laminates, protective covering against thermal radiation and weathering, pressurized containment suits, tires, fluid storage, tapes and webbing for high temperature, pressure packed decelerator applications. As molded articles, they may be used for pressure containers, insulators and other rigid forms.

To fully illustrate the present invention and the advantages thereof, the following specific examples are given, it being understood that these are merely intended to be illustrative. In the examples all parts and percentages are by weight unless otherwise indicated. Inherent viscosity values are determined in concentrated $H_2SO_4$ at 30° C., using a concentration of 0.5 g. of polymer per 100 ml. of solvent.

EXAMPLE I

*Preparation of 3,3'-diaminobenzanilide hydrochloride*

A mixture of 200 ml. of deionized ice water, 12.0 g. of sodium carbonate and 27.6 g. of m-nitroaniline was prepared. To this rapidly stirred mixture was added a solution of 38.0 g. of m-nitrobenzochloride suspended in 40 ml. of tetrahydrofuran. The mixture was stirred rapidly for a few minutes and the resulting product was isolated, thoroughly washed, dried and measured. The yield was 93.6 percent and the product had a melting point of 188° C. which compares favorably with the 185° C. melting point listed for this compound in Beilstein, vol. 14, page 390. A 30 g. portion of this 3,3′-dinitrobenzanilide was hydrogenated using a Parr low pressure hydrogenation apparatus. The dinitro compound was suspended in 250 ml. of absolute methanol and 0.5 g. of platinum oxide was added as a catalyst. After 0.624 mole of hydrogen had been absorbed, the diamine dissolved. The solution was filtered to remove catalyst residue, decolorized with charcoal and treated with 0.208 mole of anhydrous hydrogen chloride in methanol to separate the diamine dihydrochloride. The dihydrochloride was then separated by filtration, washed and dried.

EXAMPLE II

*Preparation of 4,4′ diaminobenzanilide dihydrochloride*

The 4,4′-isomer of the diamine described in Example I was prepared following the procedure of Example I except for the use of p-nitroaniline and p-nitrobenzyl chloride in place of the m-isomers and a use of only 0.3 g. of platinum oxide as a hydrogenation catalyst.

EXAMPLE III

*Preparation of 3,4′diaminobenzanilide dihydrochloride*

The 3,4′-diaminobenzanilide was prepared following the procedure of Example I except for the use of m-nitrobenzoyl chloride and p-nitroaniline as the starting materials. In this example the use of only 0.2 g. of platinum oxide as a hydrogenation catalyst was required.

EXAMPLE IV

*Polyamide from 4,4′-diaminobenzanilide and terephthaloyl chloride*

Into a 250 ml. 3-necked conical flask equipped with a stirrer, nitrogen inlet and a drying tube was placed 1.9 g. of lithium chloride in 38.0 ml. of dry dimethylacetamide. Six grams of 4,4′-diaminobenzanilide dihydrochloride was dissolved in the solution by stirring and heating to 55° C. When the diamine had dissolved, 4.06 g. (0.02 mol) of terephthaloyl chloride was added and allowed to react for about 45 minutes. After this time, 3.28 g. of lithium hydroxide monohydrate was added to neutralize the hydrogen chloride held by the dimethylacetamide. The resulting polymer solution was then poured into a 1000 ml. Waring Blendor with about 200 ml. of dimethylacetamide. This more dilute solution of polymer was then coagulated by a gradual dilution with water to about 800 ml. The polymer, poly 4,4′-diaminobenzanilide terephthalamide, referred to herein as 4,4′-DABT, was then separated by filtration, washed two times with hot water, once with an acetone and methanol mixture and was dried in a vacuum oven. The properties of this polymer are shown in Table II.

EXAMPLE V

*Preparation of poly 4,4′-diaminobenzanilide isophthalamide (4,4′-DABI)*

A 0.02 molar polymerization was carried out as described in Example IV using 4,4′-diaminobenzanilide hydrochloride and isophthaloyl chloride. The only modification of the conditions set forth in Example IV was that the reaction temperature was 42° C. at the time of addition of the acid chloride.

EXAMPLE VI

*Preparation of poly 4,4′-diaminobenzanilide-2,6-naphthalene dicarbonamide (4,4′-DABN)*

A 0.02 molar polymerization of 4,4′-diaminobenzanilide and 2,6-naphthalene dicarbonyl chloride was carried out following the procedure of Example IV. This reaction mixture formed a gel even upon the addition of 50 ml. more of dimethylacetamide in 2.5 g. of lithium chloride. The polymer was isolated, washed and dried.

EXAMPLE VII

*Preparation of poly 3,3′-diaminobenzanilide isophthalamide (3,3′-DABI)*

This polymer was prepared on a 0.02 molar scale by interfacial polymerization. To a 1 liter Waring Blendor cup was added 6.42 g. of sodium carbonate, 0.2 g. of sodium n-lauryl sulfate, 75 ml. of water and 6.0 g. of 3,3′-diaminobenzanilide dihydrochloride. To this rapidly stirred mixture was added a solution of 4.06 g. of isophthaloyl chloride in 17 ml. of benzonitrile and 9 ml. of tetrahydrofuran. The mixture was stirred for about 10 minutes and the resulting polymer was isolated by filtration, washed and dried.

EXAMPLE VIII

*Polyamide of 3,3′-diaminobenzanilide and terephthaloyl chloride (3,3′-DABT)*

This composition was prepared by the same technique described in Example IV.

EXAMPLE IX

*Polyamide of 3,3′-diaminobenzanilide and 2,6-naphthalene dicarbonyl chloride (3,3′-DABN)*

To a solution of 0.02 mols of 3,3′-diaminobenzanilide suspended in 38 ml. of dimethylacetamide containing 5 percent dissolved lithium chloride was added 0.02 mol of 2,6-naphthalene-dicarbonyl chloride. The reaction was started at −30° C. and allowed to continue reacting until it warmed to 25° C. at which time the solution was quite viscous. The polymer was coagulated, washed thoroughly and dried.

EXAMPLE X

*Polyamide from purified 3,3′-diaminobenzanilide and isophthaloyl chloride*

This polyamide was prepared in dimethylacetamide as described in Example IV, using the same amounts of reactants. Polymerization was begun at −40° C. and continued until the temperature reached +25° C. A very viscous solution was obtained. The polymer was isolated by coagulation, washed thoroughly and dried.

EXAMPLE XI

*Polyamide of 3,4′-diaminobenzanilide and isophthaloyl chloride (3,4′-DABI)*

This polymer was prepared following the procedure of Example IV. Its properties are listed in Table II.

EXAMPLE XII

*Polyamide of 3,4′-diaminobenzanilide and terephthaloyl chloride (3,4′-DABT)*

The above polyamide was prepared as described in Example IV and evaluated in Table II.

EXAMPLE XIII

*Fibers from poly-3,4′-diaminobenzanilide isophthalamide (3,4′-DABI)*

A sample of this polymer ($\eta_{inh}$=1.1) was dissolved in dimethylacetamide containing 5 percent dissolved lithium chloride and dry spun according to the prior art.

The fibers were then leached with water to remove salts and dried, drawn through a steam tube 2× at 23 p.s.i.g. inside (127° C.) and 60 p.s.i.g. outside pressure (153° C.) and 2× over a hot pin at 300–340° C. at a speed of 63 ft./min. The fibers were then tested for various properties, and the results are listed below in Table I.

TABLE I

| Temperature | Denier | Tenacity, g./d. | Elongation, percent | Modulus, g./d. |
|---|---|---|---|---|
| 70° F. in air | 2.5 | 4.8 | 27 | 72 |
| 100° C. in air | 2.5 | 4.9 | 28 | 61 |
| 200° C. in air | 2.4 | 3.6 | 30 | 36 |
| 250° C. in air | 2.8 | 2.4 | 41 | 28 |

EXAMPLE XIV

*High molecular weight poly-3,4'-diaminobenzanilide isophthalamide*

A sample of the polyamide of 3,4'-diaminobenzanilide and isophthaloyl chloride was prepared as follows: In a 500 ml. 3-necked flask equipped with a Teflon blade stirrer, nitrogen inlet and a drying tube was dissolved 12.05 g. of 3,4'-diaminobenzanilide suspended in 100 ml. of dry dimethylacetamide. This solution was cooled in an ice bath and 10.77 g. of recrystallized, redistilled isophthaloyl chloride added, and a very highly viscous clear solution resulted within a few minutes of stirring, and the solution was stirred for about one hour longer to insure the completion of the reaction. The polymer was then separated by coagulation, washed thoroughly and dried. The yield was 19.0 g. and the polymer had an inherent viscosity of 2.8. A 16 percent solution of this polymer in dimethylacetamide containing 3 percent dissolved lithium chloride was spun to fiber using a combination wet spinning system using a dry jet suspended above the coagulation bath. The fibers were hot drawn and after the drawing stage had an average tenacity of 8.55 g. per denier at 7.77 percent elongation. After 80 hours of Fadeometer exposure the fibers retained 2.81 g.p.d. at 1.98 percent elongation. An X-ray diffraction pattern indicated relatively high crystallinity.

EXAMPLE XV

*Properties of polymers of diaminobenzanilides and various diacid chlorides*

In this example the polymers prepared in the previous examples using various diaminobenzanilides and diacid chlorides were subjected to testing for various properties. Specific resistivity is the resistance of a substance to the flow of an electric current measured in ohm centimeters. This measurement was made by placing a given size piece of film or pressed polymer disc in one arm of a Wheatstone bridge device. The results of this testing are shown in Table II below.

TABLE II

| Polymer | Visual, M.P., ° C. | DTA Tm or Td | Percent wt. retention at ° C. | $\eta_{inb}$ 0.5% conc. in $H_2SO_4$ | Specific resistivity, ohm-cm. |
|---|---|---|---|---|---|
| 3,3'-DABI | 290 | 415 | 82 at 760 | 0.23 | $5.8 \times 10^{18}$ |
| 3,3'-DABT | 400 | 400 | 76 at 800 | 0.19 | $9.5 \times 10^{20}$ |
| 3,3'-DABN | 400 | 460 | 77 at 850 | 0.23 | |
| 4,4'-DABT | 490 | 570 | 82 at 775 | 0.64 | $1.5 \times 10^{19}$ |
| 4,4'-DABI | 490 | 480 | 81 at 770 | 0.75 | |
| 4,4'-DABN | 480 | 560 | 70 at 800 | 2.58 | |
| 3,4'-DABT | 430 | 500 | 76 at 750 | 0.72 | $1.9 \times 10^{20}$ |
| 3,4'-DABI | 365 | 500 | 75 at 650 | 0.67 | $1.4 \times 10^{20}$ |

Tm=M.P. by DTA. Td=Decomposition temperature. DTA=Differential Thermal Analysis.

EXAMPLE XVI

*Polymer solubility*

In this example the solubility of various polymers from diaminobenzanilides and diacid chlorides was tested in a variety of common organic polymer solvents. The results were as follows:

TABLE III

| Polymer Composition | Solvents and Results | | | | |
|---|---|---|---|---|---|
| | DMAc | DMAc +5% LiCl | DMSO +5% LiCl | $H_2SO_4$ | Hexamethyl Phosphoramide |
| 4,4'-DABT | Insol | Sl. sol. hot | Sl. sol. hot | Sol | Sol. |
| 3,3'-DABI | Sol | Sol | Sol | Sol | Insol. |
| 4,4'-DABI | Insol | Sl. sol. hot | Sl. sol. hot | Sol | Insol. |
| 3,3'-DABT | Sl. sol | Sl. sol | Sol | Sol | Insol. |
| 4,4'-DABN | Insol | Sol | Sol | Sol | Sl. sol. hot. |
| 3,3'-DABN | Insol | Sol | Sol | Sol | Insol. |
| 3,4'-DABI | Sol | Sol | Sol | Sol | Sol. |
| 3,4'-DABT | Insol | Sl. sol | Sl. sol | Sol | |
| 3,4'-DABN | | Sl. sol | | | Sol |

It is apparent from the above table that certain of the polymeric compositions of the invention have an extraordinarily high degree of solubility which permits solution spinning to be accomplished with ease. Such compositions may then be heat treated after spinning and rendered resistant to high temperatures and further action by solvents.

EXAMPLE XVII

*Properties of 3,4'-diaminobenzanilide isophthalamide*

In this example a sample of poly-3,4'-diaminobenzanilide isophthalamide was dry spun according to the prior art and the resulting fibers subjected to various physical and chemical tests—the results of which may be found in the following table. Tensile properties were determined on unboiled single filaments using an Instron tester. Boiling water shrinkage was determined by immersion of fibers in boiling water for 5 minutes.

Physical properties:
- Shrinkage in boiling water (percent) ____ 2
- Shrinkage in air at 195° C. (percent) ___ 2.3
- Shrinkage in air at 250° C. (percent) ___ 4
- Moisture regain (65% R.H. at 25° C.) (percent) _____ 7
- Specific birefringence _____ 211×10³

TABLE IV

[Chemical Resistance—Tenacity retained after soaking in various chemicals (original tenacity 3.5 g./d.)]

| Chemical | Temperature, °C. | Tenacity (g./d.) after 10 hours exposure |
| --- | --- | --- |
| 10% NaOH | 60 | 2.8 |
| 50% NaOH | 25 | 2.7 |
| 50% NaOH | 60 | Failed |
| 10% H₂SO₄ | 60 | 3.7 |
| 50% H₂SO₄ | 60 | 2.8 |
| Stoddard solvent | 25 | 3.3 |
| Tetrachloroethylene | 25 | 3.2 |

These results indicate that fibers prepared from the polymers of this invention show good retention of tensile properties up to 250° C. and low shrinkage in boiling water and in air at 250° C. These properties compare quite favorably with other commercial fibers of wholly aromatic polyamides.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:

1. A wholly aromatic polyamide composed of structural units of the formula

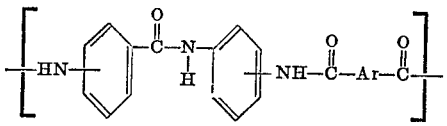

wherein Ar represents a divalent hydrocarbon aromatic radical and wherein the valence bonds are oriented other than ortho.

2. As a new composition of matter poly-3,4'-diaminobenzanilide isophthalamide.

3. As a new composition of matter poly-3,4'-diaminobenzanilide terephthalamide.

4. As a new composition of matter poly-4,4'-diaminobenzanilide isophthalamide.

5. As a new composition of matter poly-4,4'-diaminobenzanilide terephthalamide.

6. As a new composition of matter poly-4,4'-diaminobenzanilide-2,6-naphthalene dicarbonamide.

7. The polyamide of claim 1 in the form of a fiber.

8. The polyamide of claim 1 in the form of a self-supporting film.

9. A process for the preparation of wholly aromatic polyamides of the formula

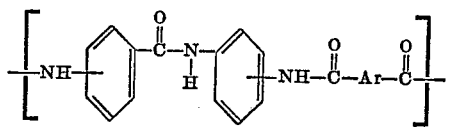

wherein Ar represents a divalent hydrocarbon aromatic radical and wherein the valence bonds are oriented other than ortho, comprising reacting together with stirring substantially equimolar proportions of a diamine of the formula

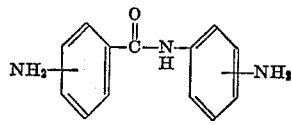

wherein the valence bonds are oriented other than ortho and an aromatic diacid chloride of the formula

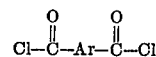

wherein Ar represents a divalent hydrocarbon aromatic radical whose valence bonds are oriented other than ortho, in the presence of an organic solvent at a temperature at which the solvent is inert in the process and continuing the reaction until a polymeric product is formed.

10. A process for the preparation of poly-4,4'-diaminobenzanilide terephthalamide comprising reacting together with stirring substantially equimolar proportions of a solution of 4,4'-diaminobenzanilide dihydrochloride in dimethylacetamide containing 3 percent dissolved lithium chloride and terephthaloyl chloride at a temperature at which the dimethylacetamide is inert in the process and continuing the reaction until a polymeric product is formed.

11. A process for the preparation of poly-3,4'-diaminobenzanilide isophthalamide comprising reacting together with stirring substantially equimolar proportions of a solution of 3,4'-diaminobenzanilide dihydrochloride in dimethylacetamide isophthaloyl chloride at a temperature at which the dimethylacetamide is inert in the process and continuing the reaction until a polymeric product is formed.

12. A process for the preparation of poly-3,3'-diaminobenzanilide 2,6-naphthalene dicarbonamide comprising reacting together with stirring substantially equimolar proportions of a solution of 3,3'-diaminobenzanilide in dimethylacetamide containing 5 percent dissolved lithium chloride and 2,6-naphthalene dicarbonyl chloride at a temperature at which the dimethylacetamide is inert in the process and continuing the reaction until a polymeric product is formed.

13. A process for the preparation of poly-3,3'-diaminobenzanilide isophthalamide comprising reacting together with stirring substantially equimolar proportions of a solution of 3,3'-diaminobenzanilide in dimethylacetamide containing 3 percent dissolved lithium chloride and isophthaloyl chloride at a temperature at which the dimethylacetamide is inert in the process and continuing the reaction until a polymeric product is formed.

14. A process for the preparation of poly-3,3'-diaminobenzanilide terephthalamide comprising reacting together with stirring substantially equimolar proportions of a solution of 3,3'-diaminobenzanilide in dimethylacetamide containing 3 percent dissolved lithium chloride and terephthaloyl chloride at a temperature at which the dimethylacetamide is inert in the process and continuing the reaction until a polymeric product is formed.

References Cited

UNITED STATES PATENTS

| | | | |
| --- | --- | --- | --- |
| 3,094,511 | 6/1963 | Hill et al. | 260—78 |
| 3,179,635 | 4/1965 | Frost et al. | 260—78 |
| 3,202,933 | 8/1965 | Huffman et al. | 260—78 |
| 3,225,011 | 12/1965 | Preston et al. | 260—78 |
| 3,228,902 | 1/1966 | Beste | 260—78 |
| 3,232,910 | 2/1966 | Preston | 260—78 |
| 3,240,758 | 3/1966 | Smith et al. | 260—78 |
| 3,240,760 | 3/1966 | Preston et al. | 260—78 |

WILLIAM H. SHORT, *Primary Examiner.*

H. D. ANDERSON, *Assistant Examiner.*